US008726371B2

(12) United States Patent
Toebes et al.

(10) Patent No.: US 8,726,371 B2
(45) Date of Patent: May 13, 2014

(54) ENHANCED SECURITY FOR DEVICES ENABLED FOR WIRELESS COMMUNICATIONS

(75) Inventors: John A. Toebes, Cary, NC (US); Joseph B. Burton, Livermore, CA (US); David F. Baker, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 108 days.

(21) Appl. No.: 13/185,185

(22) Filed: Jul. 18, 2011

(65) Prior Publication Data
US 2013/0024932 A1 Jan. 24, 2013

(51) Int. Cl.
*H04L 29/06* (2006.01)
(52) U.S. Cl.
USPC .......................................................... 726/19
(58) Field of Classification Search
USPC .............................. 726/9, 19, 2; 713/183, 182
See application file for complete search history.

(56) References Cited

U.S. PATENT DOCUMENTS

| 7,000,116 | B2 * | 2/2006 | Bates et al. ................... 713/182 |
| 7,259,671 | B2 | 8/2007 | Ganley |
| 7,428,411 | B2 | 9/2008 | Zellner |
| 8,132,236 | B2 * | 3/2012 | Hawkins et al. .................. 726/4 |
| 2005/0272445 | A1 | 12/2005 | Zellner |
| 2008/0320588 | A1 | 12/2008 | Lipetz |
| 2010/0024028 | A1 * | 1/2010 | Baugher et al. ................. 726/17 |
| 2012/0023573 | A1 * | 1/2012 | Shi .................................. 726/17 |
| 2012/0084734 | A1 * | 4/2012 | Wilairat ....................... 715/863 |
| 2012/0311695 | A1 * | 12/2012 | Kohlenberg et al. ............ 726/16 |

OTHER PUBLICATIONS

"BT Watcher 1.5.0," http://www.filedudes.com/BT_Watcher-download-50403.html, Apr. 6, 2012.

* cited by examiner

*Primary Examiner* — Ali Abyaneh
(74) *Attorney, Agent, or Firm* — P. Su

(57) ABSTRACT

In one embodiment, a method includes determining a location of a device relative to a reference, and identifying a first password from a plurality of passwords for use to unlock the device based on the location of the device relative to the reference. The plurality of passwords includes at least one complex password and at least one simple password. The method also includes prompting for input arranged to unlock the device, obtaining the input, and determining when the input matches the first password. When it is determined that the input matches the first password, the device is unlocked.

25 Claims, 11 Drawing Sheets

ENHANCED SECURITY FOR DEVICES ENABLED FOR WIRELESS COMMUNICATIONS

TECHNICAL FIELD

The disclosure relates generally to telephony systems and, more specifically, to utilizing different levels of security to allow access to features associated with a device based upon the location and/or the environment at which the device is located.

BACKGROUND

The ability to protect personal information stored on and/or accessible through portable electronic devices, e.g., smart phones, is critical to ensure owner privacy. As portable electronic devices are easily misplaced by or stolen from an owner, the ability to prevent those who may come across misplaced or stolen devices from accessing data of the owner is crucial to prevent an invasion of privacy. To reduce the likelihood of unauthorized access to personal information stored on and/or accessible through a portable electronic device, many devices are arranged to be locked such that the personal information is generally not accessible unless a security code or a password is successfully provided.

Many smart phones are configured to effectively strike a balance between security and convenience when providing the ability to lock the smart phones. Often, a smart phone may be unlocked such that features of the smart phone may be accessed upon successful entry of a four digit security code. The inability to unlock a smart phone absent successful entry of a four digit security code provides some privacy protection. However, a potential wrongdoer may be able to determine a four digit security code associated with a smart phone relatively easily. For example, a potential wrongdoer may observe an owner of a smart phone as the owner enters a four digit security code, observe keys on a keyboard of a smart phone that appear to have the most common usage, and/or observe a screen of a smart phone to identify screen swipes. As a result, if a smart phone belonging to someone else is obtained by a wrongdoer, the wrongdoer may potentially gain access to large amounts of data. In some instances, a wrongdoer who accesses data on a smart phone belonging to someone else may also use the smart phone to gain access to a private network, e.g., a corporate infrastructure, he or she would otherwise be unable to access. Thus, a wrongdoer may cause significant damage if he or she is able to unlock a smart phone that belongs to someone else.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1A:
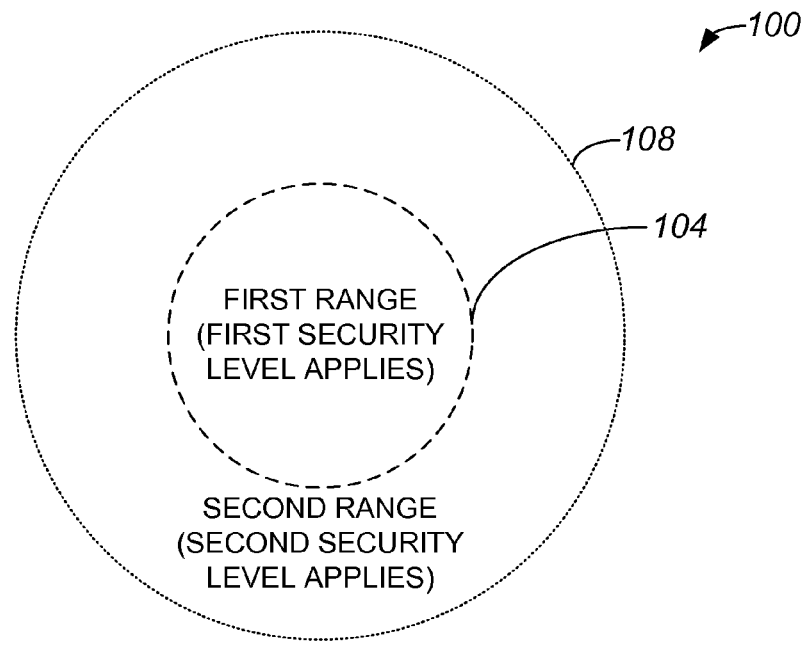
FIG. 1A is a diagrammatic representation of an overall environment that includes ranges within which different security levels apply in accordance with an embodiment.

According to one aspect, a method includes determining a location of a device relative to a reference, and identifying a first password from a plurality of passwords for use to unlock the device based on the location of the device relative to the reference. The plurality of passwords includes at least one complex password and at least one simple password. The method also includes prompting for input arranged to unlock the device, obtaining the input, and determining when the input matches the first password. When it is determined that the input matches the first password, the device is unlocked.

Description

Many devices, as for example cell phones and smart phones, include a screen locking function that enables the devices to remain locked unless a correct security code or password is provided. The ability to lock a device allows features associated with the device, as for example, data and applications, to be protected from unauthorized access. Thus, the security of information stored on, or otherwise accessible through, the device may be protected.

A screen locking function on a device is generally an interface that prompts a user of the device to enter a password, and provides the user with access to features of the device upon a determination that the password was accurately entered. As many users of smart phones that have a screen locking function invoke the screen locking function fairly often, many users set a short or simple password for use in unlocking a phone and providing the user with access to features of the phone due, for example, to the convenience associated with the ability to quickly enter a short or simple password.

Short or simple passwords are generally not strong passwords, and may be relatively easy to determine. By way of example, a simple password that is a common sequence of digits or characters may be readily guessed by a wrongdoer who is in possession of a misplaced smart phone. When a wrongdoer gains access to features of a phone that belongs to another, the wrongdoer may engage in activities using the features of the phone in a manner that may have an adverse effect, e.g., in a manner that may compromise the privacy of the owner of the phone.

In one embodiment, a screen locking function of a device is associated with different passwords. A relatively weak password, e.g., a short or simple password, may be set to unlock the device such that features of the device may be accessed when there is a relatively high likelihood that the device is in the possession of an owner or other rightful user. A relatively strong password, e.g., a long or complex password, may be set to unlock the device such that features of the device may be accessed when there is a significant likelihood that the device is no longer in the possession of an owner. Thus, a rightful user of a device may utilize an "easy" password to unlock the device, while a wrongdoer who comes into possession of the device may not be able to unlock the device using the easy password. If there is a significant likelihood that the device is no longer in possession of an owner, the owner retains the ability to unlock the device, as the owner will have the ability to unlock the device using a more "complicated" password that may be difficult for a wrongdoer to identify.

A device may be identified as having a relatively high likelihood of being in the possession of an owner if the device is detected as being within a communications distance or range from a token, i.e., within a pairing distance from the token, to which the device is paired. For example, if a Bluetooth-capable smart phone is paired to a Bluetooth headset, the phone may be identified as having a relatively high likelihood of being in the possession of an owner if the phone and the headset are able to exchange signals. Conversely, a device may be identified as having a significant likelihood of not being in the possession of an owner if the device is not detected within a communications distance or range from a token to which the device is paired. For example, if a Bluetooth-capable smart phone is paired to a Bluetooth headset, the phone may be identified as having a significant likelihood of not being in the possession of an owner if the phone and the headset are unable to exchange signals.

A device may also be identified as having a relatively high likelihood of being in the possession of an owner if the device is detected as being within a known environment. For example, if a device owned by an enterprise is detected as being at a location associated with the enterprise, the device may be identified as having a relatively high likelihood of being in the possession of an owner. Conversely, a device may be identified as having a significant likelihood of not being in the possession of an owner if the device is detected in an unknown environment. For example, if a device owned by an enterprise is not detected at a location associated with the enterprise, the device may be identified as having a significant likelihood of not being in the possession of an owner.

A simple password may be used to gain access to features of a device when there is a relatively high likelihood that the device is in the possession of an authorized user and, therefore, when the security of the device is likely not at risk. A complex password may be used to gain access to features of a device when there is a significant likelihood that the device is not in the possession of an authorized user and, thus, when there is a significant likelihood that the security of the device may be at risk.

By having different passwords associated with different situations, different passwords may effectively represent different security levels. Relatively complex passwords may be used when there is a significant likelihood of a security risk, and passwords that are less complex may be used when there is essentially no significant likelihood of a security risk.

In one embodiment, when a device is within a first range relative to a reference, e.g., a token, there is essentially no significant likelihood of a security risk and a less complex password may be used to unlock the device. In such an embodiment, when the devices is not within the first range, and may be in a second range, relative to the reference, there may be a significant likelihood of a security risk and a relatively complex password may be used to unlock the device. Referring initially to FIG. 1A, an overall environment that includes ranges within which different security levels apply in accordance with an embodiment. An overall environment 100 includes a first range 104 and a second range 108. Although second range 108 is shown as having a border, it should be appreciated that second range 108 may generally be substantially infinite. That is, second range 108 may generally encompass substantially all areas that are not within first range 104.

First range 104 may effectively be an environment defined with respect to a reference. For example, for a reference that is a token (not shown), first range 104 may be an environment defined substantially around the token. Defining first range 104 with respect to a reference may include, but is not limited to including, defining first range 104 as an area within which Bluetooth communications between a device (not shown) and a token (not shown) may occur, an area within which a wireless network such as a WiFi network signal may be detected, or as a physical location such as a building.

Figure 1B:
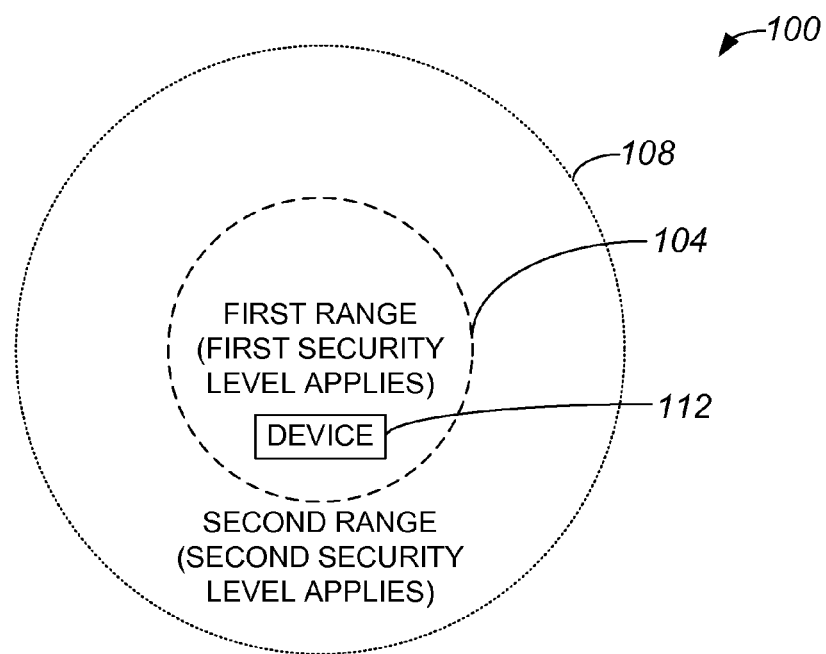
FIG. 1B is a diagrammatic representation of an overall environment that in which a device is located in a first range, e.g., range 104 of FIG. 1A, in accordance with an embodiment.
Figure 1C:
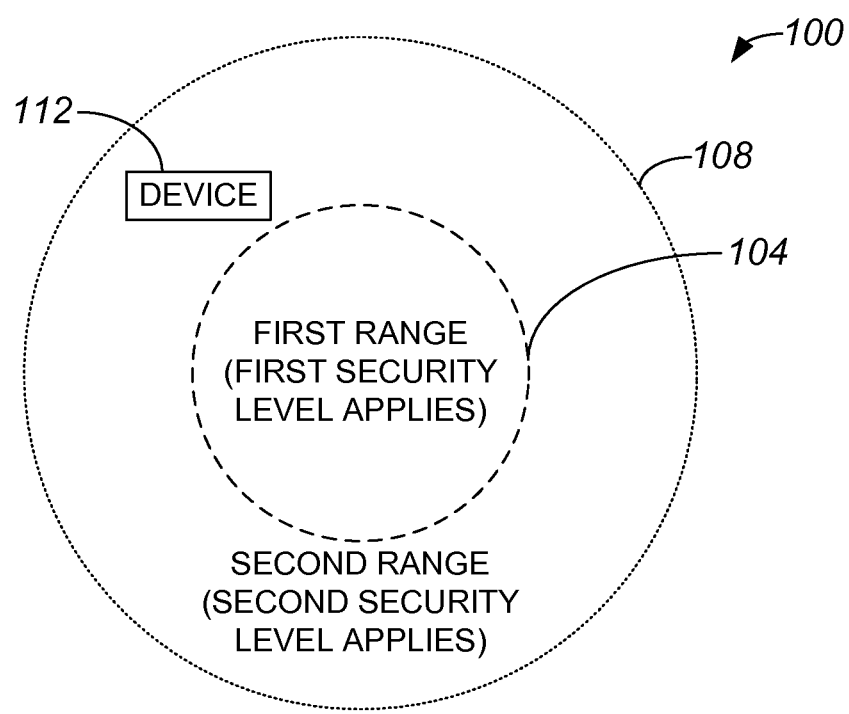
FIG. 1C is a diagrammatic representation of an overall environment that in which a device is located in a second range, e.g., range 108 of FIG. 1A, in accordance with an embodiment.

Within first range 104, a first security level effectively applies, while within second range 108, a second security level effectively applies. In the described embodiment, first range 104 is associated with a less secure or relatively simple password while second range 108 is associated with a more secure or relatively complex password. Thus, as shown in FIG. 1B, when a device 112 is within first range 104, device 112 may be unlocked using a relatively simple password, as the associated security level may be such that the risk of device 112 not being in the possession of an owner or user is relatively low. On the other hand, when device 112 is within second range 108, as shown in FIG. 1C, device 112 may be unlocked using a relatively complex password, as the associated security level may be such that the risk of device 112 not being in the possession of an owner or user is relatively high. By way of example, a four digit password may be arranged to unlock device 112 when device 112 is within first range 104, as shown in FIG. 1B, while a password that includes more than four digits may be arranged to unlock device 112 when device 112 is within second range 104, as shown in FIG. 1C.

In general, when a device is within a particular environment, or a known environment, a simple password may be used to unlock the device. The particular environment may be an area or range defined with respect to a reference, e.g., a token with which the device is paired, such that when the device is within communications range of the token, the device is within the particular environment. For example, a simple password may be used to unlock a device that is paired to a token when the device is within a communications range of the token, while a complex password may be used to unlock the device when the device is outside of the communications range of the token.

Figure 2A:
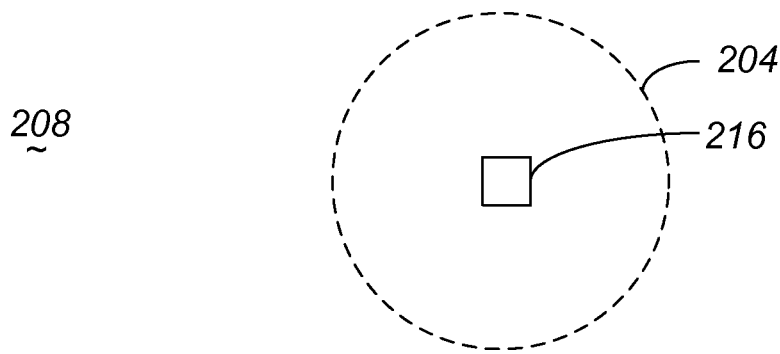
FIG. 2A is a diagrammatic representation of a token, e.g., a Bluetooth-capable headset, within a range in accordance with an embodiment.

FIG. 2A is a diagrammatic representation of a token, e.g., a Bluetooth-capable headset, within a range in accordance with an embodiment. A token 216 has a range 204 defined substantially around token 216. In one embodiment, token 216 may be a Bluetooth-capable headset, and range 204 may be a communications range of the headset. Token 216 is generally unable to communicate outside of range 204, i.e., in a range 208. It should be appreciated that although range 204 is described as being defined with reference to a token 216, a range may generally be defined with respect to any suitable apparatus that is capable of communicating with another apparatus.

Figure 2B:
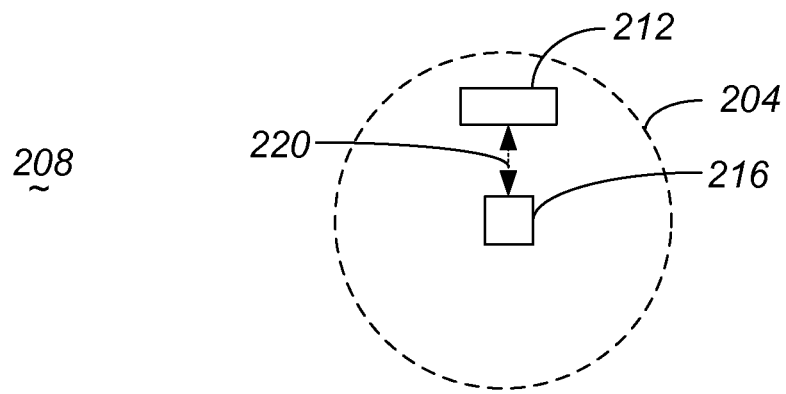
FIG. 2B is a diagrammatic representation of a token, e.g., token 216 of FIG. 2A, being paired to a device in accordance with an embodiment.

Token 216 may generally be paired to a device 212, e.g., a Bluetooth-enabled phone, as shown in FIG. 2B. Typically, device 212 is paired to token 216 when device 212 is within range 204. That is, a pairing process by which device 212 is paired to token 216 may occur when device 212 is within a communications range of token 216. As will be appreciated by those skilled in the art, a pairing process effectively causes device 212 to recognize token 216, and vice versa, such that device 212 and token 216 may communicate with each other over a connection 220, e.g., a wireless connection such as a Bluetooth link, when device 212 is within range 204. In one embodiment, after a successful pairing, the process may include setting a plurality of passwords such as a simple password and a complex password. One suitable method of setting device 212 and token 216 such that different passwords may be associated with unlocking device 212 will be described below with reference to FIG. 3. When device 212 is within range 204, if device 212 becomes locked such that features of device 212 are not accessible, a simple password may be used to unlock device 212.

Figure 2C:
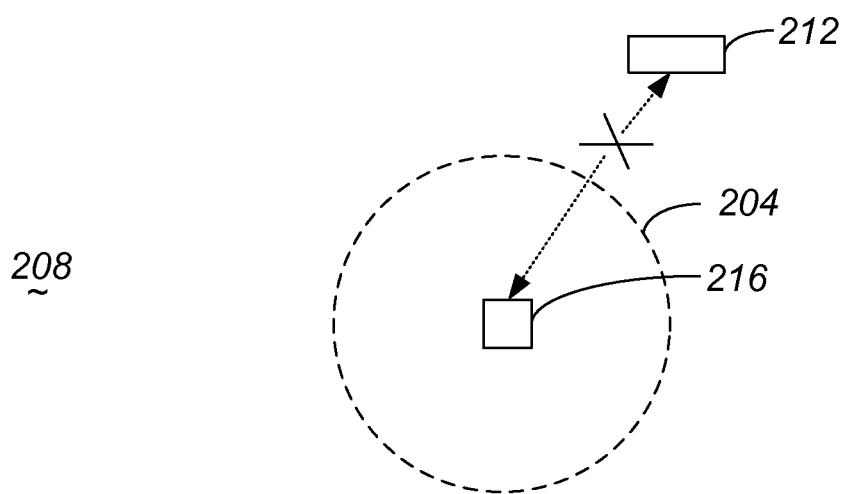
FIG. 2C is a diagrammatic representation of a token e.g., token 216 of FIG. 2A, losing pairing with a device, e.g., device 212 of FIG. 2B, when the device moves out of a particular range with respect to the device in accordance with an embodiment.

Once device 212 moves out of range 204 and into range 220, device 212 and token 216 may no longer communicate using connection 220. FIG. 2C depicts device 212 and token 216 after device 212 has moved into range 208. Because device 212 is no longer within range 204, device 212 and token 216 are generally unable to detect each other. In other words, when device 212 is in range 208, device 212 is essentially unable to detect the presence of token 216, and token is essentially unable to detect the presence of device 212. As a result, if device 212 becomes locked, a complex password may be used to unlock device 212, as a simple password is no longer effective to unlock device 212.

Figure 3:
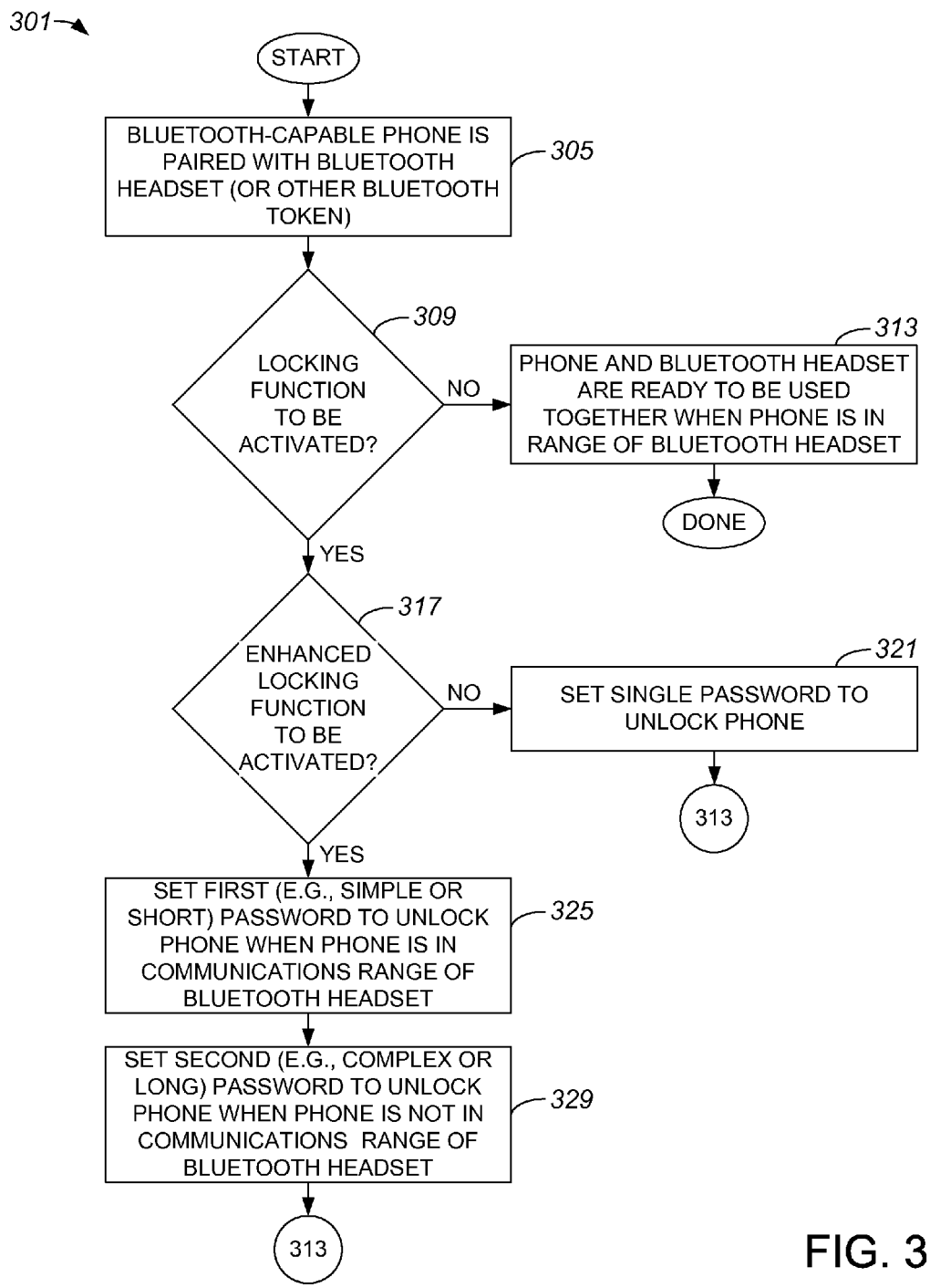
FIG. 3 is a process flow diagram which illustrates a process of configuring a device relative to a token in accordance with an embodiment.

With reference to FIG. 3, a method of configuring a device such that different passwords may be used to unlock the device will be described in accordance with an embodiment. In the described embodiment, the device is a Bluetooth-capable phone and the token is a Bluetooth headset, although it should be appreciated that a device and a token are not limited to being a Bluetooth-capable phone and a Bluetooth headset, respectively. A method 301 of configuring a device relative to a token begins at step 305 in which a phone is paired with a headset using any suitable pairing method. Interfaces associated with the phone may be used to pair the phone and the headset, or a separate application executing a computing device may be used to pair the phone and the headset.

Once the phone is paired with the headset, a determination is made in step 309 as to whether a locking function of the phone is to be activated. That is, it is determined if a possessor of the phone wishes to invoke a locking function such that features of the phone are not accessible unless a password is correctly provided. If it is determined that a locking function is not to be activated, e.g., if a possessor of the phone provides an indication that the locking function is not to be activated, then the phone and headset are substantially ready to be used together when the phone is in range of the headset, and the method of pairing a device relative to a token is completed.

Alternatively, if it is determined in step 309 that the locking function is to be activated, a determination is made in step 317 as to whether an enhanced locking function is to be activated. In one embodiment, a determination as to whether an enhanced locking function is to be activated includes determining whether to set more than one password for use in locking the phone. If the determination in step 317 is that an enhanced locking function is not to be activated, a single password is set to unlock the phone in step 312. As such, regardless of the proximity of the phone to the headset at a time when the phone is to be unlocked, a single password will be arranged to unlock the phone. After the single password is set, process flow moves to step 313 in which the phone and the headset are ready to be used together when the phone is in range of the headset.

Returning to step 317, if the determination is that an enhanced locking function is to be activated, a first password is set in step 325. The first password is arranged to unlock the phone when the phone is in proximity to, e.g., in a communications range of, the headset. The first password is generally a relatively short or simple password, such as a password that is relatively easy to remember and/or convenient to enter into the phone when prompted. Once the first password is set, a second password arranged to unlock the phone when the phone is not in communications range of the headset is set in step 329. The second password is generally longer and more complex than the first password. Upon setting the second password, process flow moves to step 313 in which the phone and the headset are ready to be used together when the phone is in range of the headset.

Figure 4:
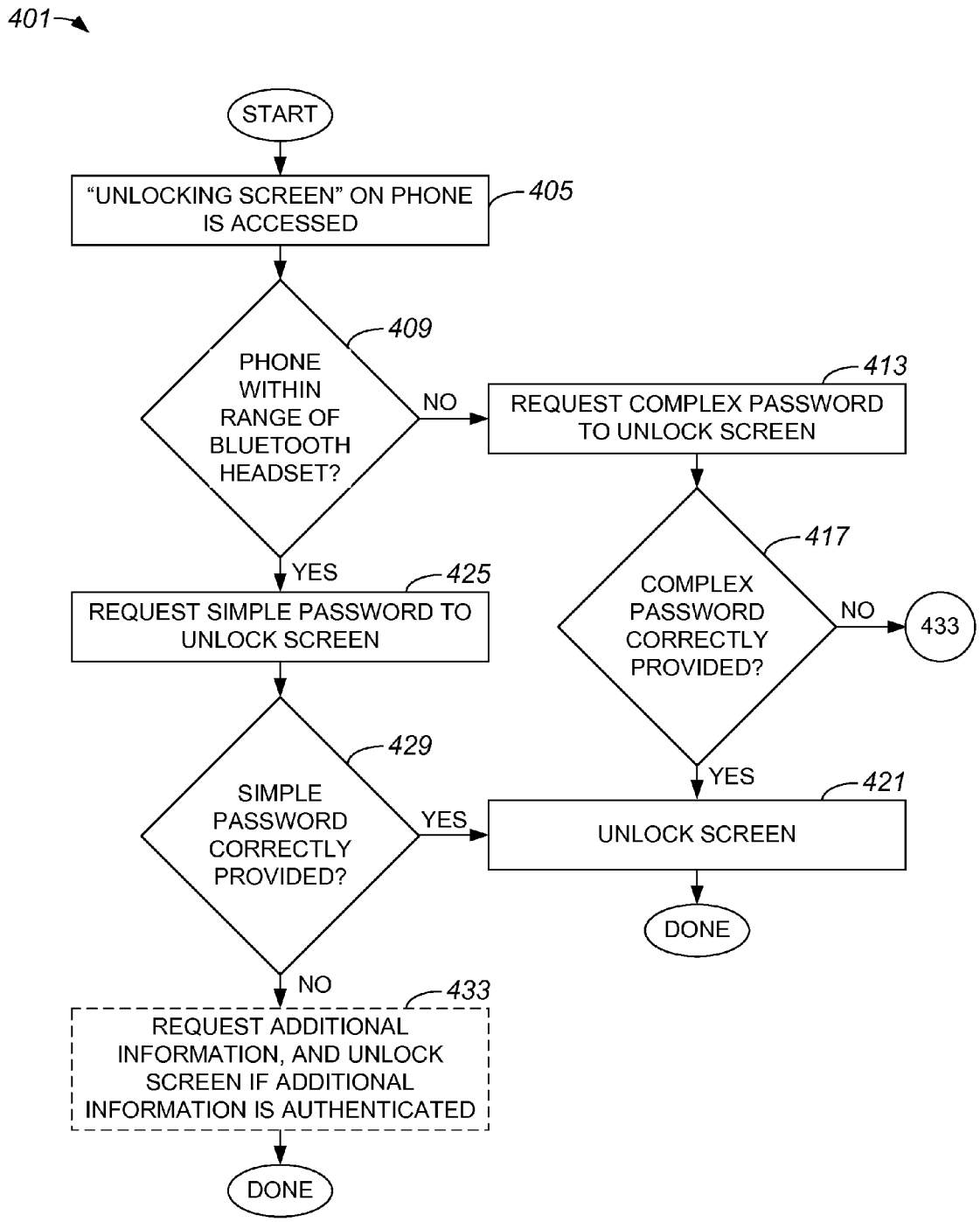
FIG. 4 is a process flow diagram which illustrates a method of unlocking a device that is paired with a token in accordance with a first embodiment.

In one embodiment, a device, e.g., a Bluetooth-enabled smart phone, may not be unlocked if the device is not within range of a token, e.g., a Bluetooth headset, unless a complex password is entered. Thus, if a smart phone is removed from the vicinity of an owner in possession of a Bluetooth headset that is paired to the smart phone, features of the smart phone effectively become inaccessible to anyone who is not in possession of a complex password. FIG. 4 is a process flow diagram which illustrates a method of unlocking a device that is paired with a token in accordance with a first embodiment. A method 401 of unlocking a device begins at step 405 in which an "unlocking screen" on the device is accessed. In the described embodiment, the device is a smart phone and an unlocking screen is generally an interface which allows the input of characters, e.g., digits, arranged to unlock features of the smart phone. It should appreciated that an unlocking screen is typically displayed on a smart phone upon awakening or powering up the smart phone. The unlocking screen may generally display at least one field that is arranged to obtain input, e.g., digits or characters, and/or a keypad that may be used to obtain input.

Upon a phone sensing that features of the phone are to be unlocked or otherwise accessed, a determination is made in step 409 as to whether the phone is within range of a token. In the described embodiment, the token is a headset, e.g., a Bluetooth-enabled headset, which is paired to the phone. Hence, a determination of whether the phone is within range of a headset to which the phone is paired may include a determination of whether the phone and the headset are close enough to enable communications to occur. It should be appreciated that a determination as to whether the phone is within range of the headset may be made by a sensing arrangement of the phone that is configured to detect whether the headset is within a communications range of the phone.

If it is determined in step 409 that the phone is within range of the headset, the indication is that the phone is still in the possession of a rightful user of the phone, e.g., an owner of the phone, and that the rightful user is attempting to unlock the phone. Accordingly, a simple password is requested in step 425 through the unlocking screen. As previously mentioned, the simple password may be a relatively short password. Upon obtaining input through the unlocking screen, a determination is made in step 429 regarding whether the simple password is correctly provided. It should be appreciated that a user who is attempting to unlock the phone may be provided with any number of attempts to correctly provide the simple password. In one embodiment, a user may be re-prompted to enter the simple password until the simple password is correctly provided.

If it is determined that the simple password is correctly provided, then the unlocking screen is unlocked in step 421. In other words, the phone is effectively unlocked and features of the phone may be accessed in step 421 once a simple password is correctly entered through the unlocking screen. After the unlocking screen is unlocked, the method of unlocking a device is completed.

Alternatively, if it is determined in step 429 that the simple password is not correctly provided, process flow moves to an optional step 433 in which additional information is requested, and the unlocking screen may be unlocked if the additional information is authenticated. The additional information may include, but is not limited to including, answers to security questions that have been preset and/or identifying information associated with an owner or user of the phone. After additional information is optionally requested, the method of unlocking a device is completed. It should be understood that in one embodiment, when a simple password is not correctly provided, no additional information may be requested, and the unlocking screen may remain locked.

Returning to step 409, if the determination is that the phone is not within range of the headset, then a more complex password is requested in step 413 to unlock the unlocking screen and, hence, the phone. In step 417, it is determined whether the complex password is correctly provided. If the determination is that the complex password is not correctly provided, process flow proceeds to optional step 433 in which additional information is requested, and the unlocking screen is unlocked if the additional information is authenticated. Alternatively, if the determination in step 417 is that the complex password is correctly provided, then the unlocking screen and, hence, the phone is unlocked in step 421.

Figure 5:
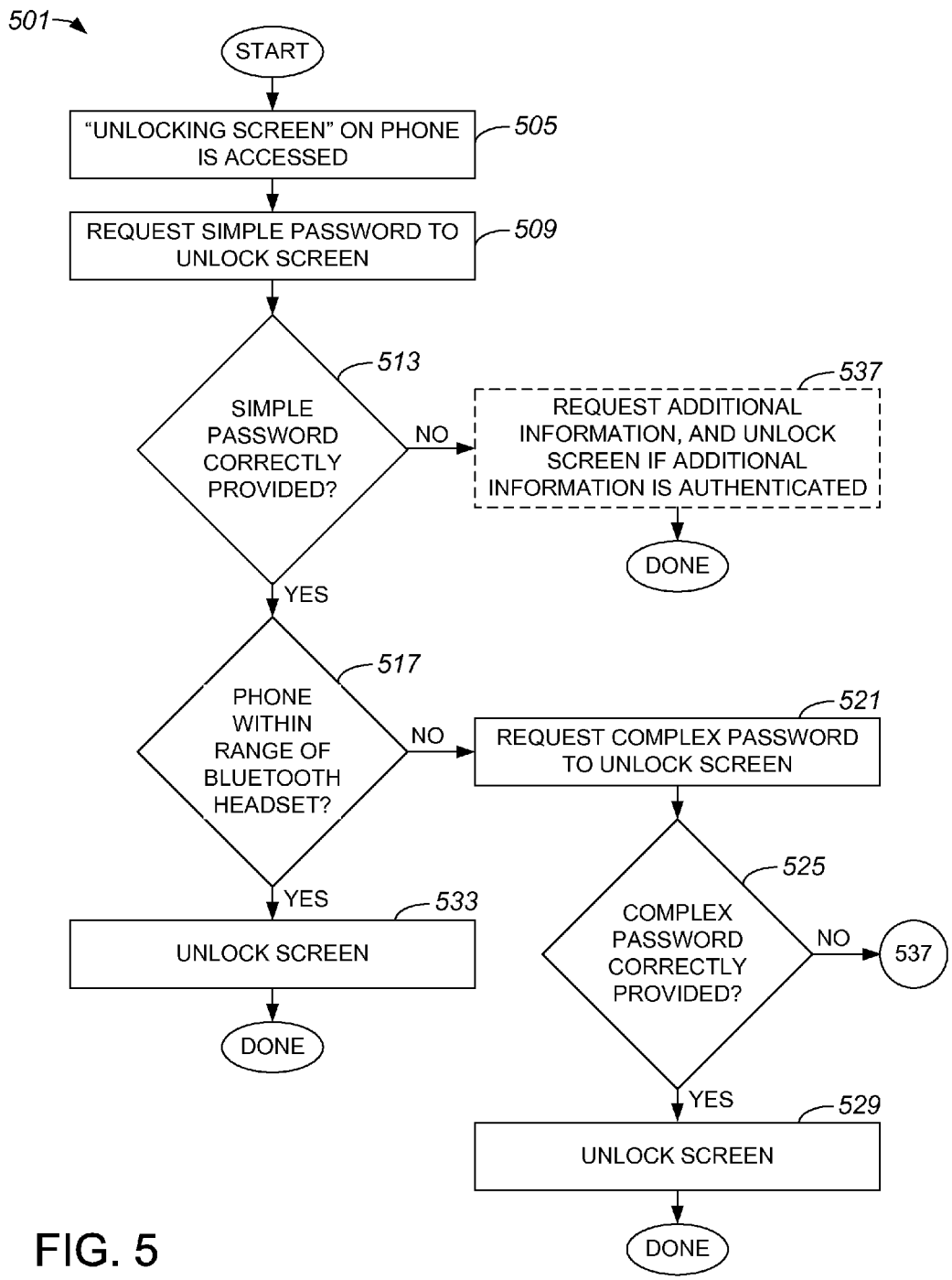
FIG. 5 is a process flow diagram which illustrates a method of unlocking a device that is paired with a token in accordance with a second embodiment.

In one embodiment, both a simple password and a complex password may be requested by a device to unlock the device when the device is not within range of a token. Referring next to FIG. 5, a method of unlocking a device that is paired with a token using a series or sequence of passwords will be described in accordance with an embodiment. A method 501 of unlocking a device begins at step 505 in which an unlocking screen on a device is accessed. For ease of discussion, the device will be referred to as a smart phone that is paired to a headset, e.g., where the phone is arranged to engage in Bluetooth communications with the headset. It should be appreciated, however, that a device is not limited to being a phone.

Once the unlocking screen on the phone is accessed, a simple password is requested in step 509. The requested simple password is generally arranged to unlock the unlocking screen of the phone and, hence, provide access to features associated with the phone. If it is determined that the simple password is not correctly provided in step 513, process flow moves to an optional step 537 in which additional information is requested, and the unlocking screen may be unlocked if additional information provided using the unlocking screen is authenticated. Additional information may generally be any information that is known to an owner or a user of the phone. After additional information is optionally requested, the method of unlocking the device is completed. In one embodiment, when it is determined in step 513 that a simple password is not correctly provided, in lieu of requesting and authenticating additional information, the unlocking screen may remain locked.

Alternatively, if it is determined in step 513 that a simple password is correctly provided, then a determination is made in step 517 as to whether the phone is within range of a headset or, more generally, a token with which the phone is paired. If the determination is that the phone is within range of the headset, the implication is that the phone is in the possession of a rightful user or owner. Thus, as a rightful user or owner likely has possession of the phone, access to the features of the phone may be provided upon entry of a simple password. Accordingly, the unlocking screen is unlocked in step 533 to provide access to the features of the phone, and the method of unlocking a device is completed If the determination in step 517 is that the phone is not within range of the headset, then the implication is that there is a possibility that a rightful user or owner may not be in possession of the phone. As such, process flow proceeds to step 521 in which a complex password is requested to unlock the unlocking screen and, hence, the phone. Upon obtaining input to the unlocking screen, e.g., digits or characters entered into a field displayed on the unlocking screen, it is determined in step 525 whether the complex password is correctly provided. If the determination is that the complex password is not correctly provided, then process flow proceeds to optional step 537 in which additional information is requested, and the unlocking screen is unlocked if the additional information is authenticated. Alternatively, if the determination in step 525 is that the complex password is correctly provided, then the unlocking screen and, hence, the phone is unlocked in step 529 and the method of unlocking a device is completed.

As described above, when a complex password needed to access features of a phone is incorrectly provided, access to substantially all features of the phone may be denied. That is, when a complex password is requested but not accurately entered, a phone may remain locked. In one embodiment, however, when a complex password is requested but not accurately entered, rather than denying access to substantially all features of a phone, access may be provided to a subset of substantially all features of the phone if a simple password is accurately entered. By way of example, if a complex password is incorrectly provided but a simple password is correctly provided, a phone may be unlocked such that calls may be placed but such that personal data may not be viewed or otherwise accessed. In another embodiment, when a complex password is requested but not accurately entered, false data may be presented on the screen of the phone such that the phone appears to have been successfully unlocked. By providing false data that gives the appearance of the phone being successfully unlocked, a wrongdoer may believe that he or she has successfully gained access to features of the phone and, therefore, be prevented from continuing to attempt to access features of the phone.

Figure 6A:
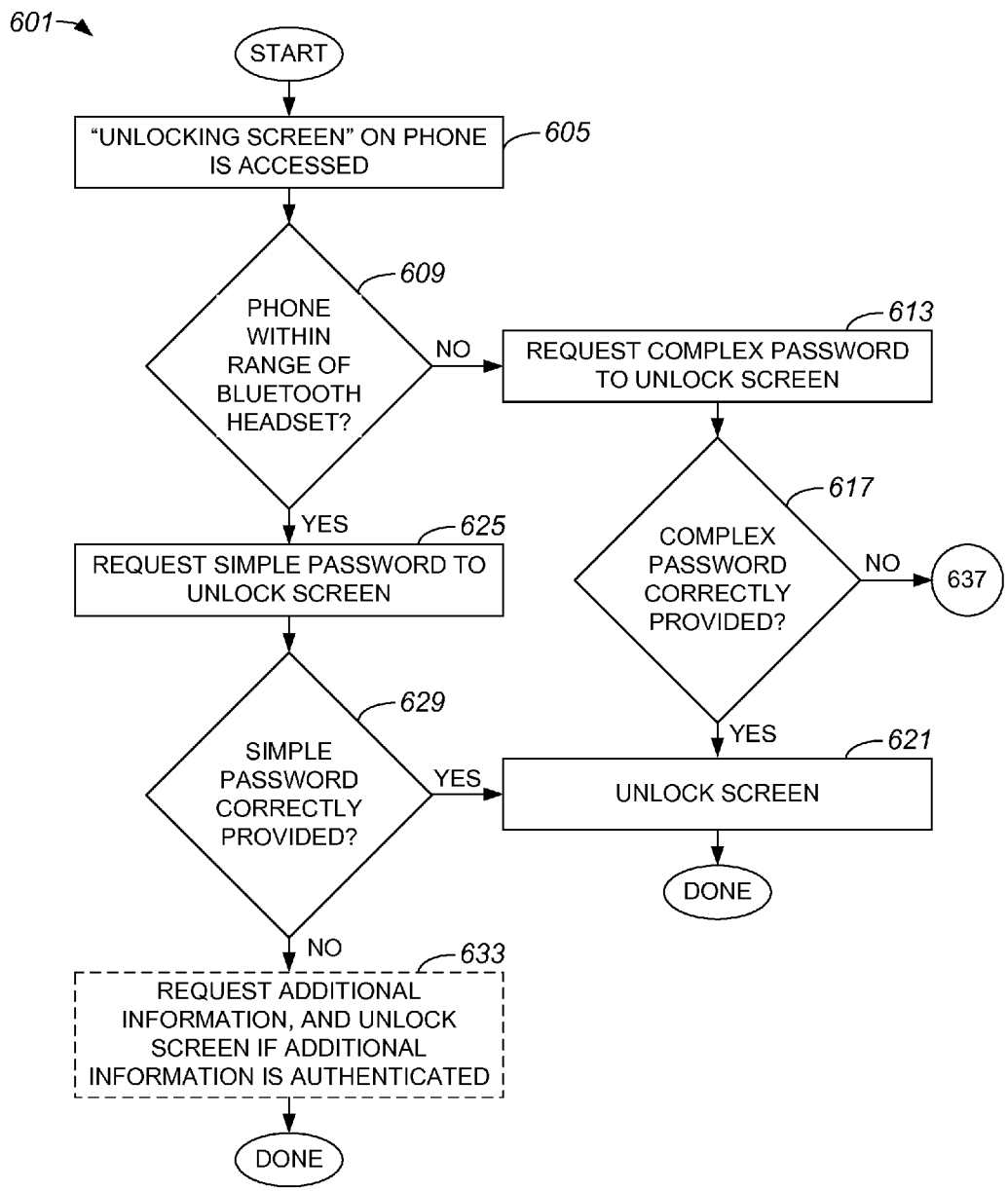
FIGS. 6A and 6B are a process flow diagram which illustrates a method of unlocking a device that is paired with a token in accordance with a third embodiment.
Figure 6B:
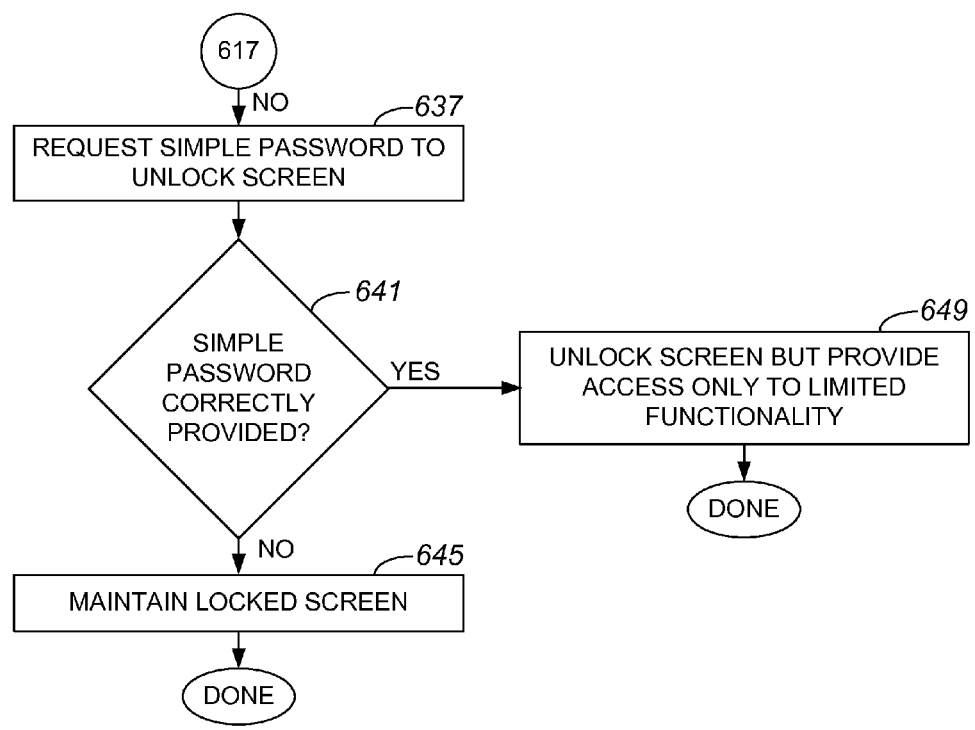

FIGS. 6A and 6B are a process flow diagram which illustrates a method of unlocking a device, e.g., a phone, that enables limited access to features of the device even if a complex password is not accurately provided in accordance with an embodiment. A method 601 of unlocking a device begins at step 605 in which an unlocking screen on the device is accessed. In the described embodiment, the device is a phone, although it should be appreciated that a device is not limited to being a phone.

A determination is made in step 609 as to whether the phone is within range of a token. In the described embodiment, the token is a headset, e.g., a Bluetooth-enabled headset, which is paired to the phone. Thus, a determination of whether the phone is within range of a headset to which the phone is paired may include a determination of whether the phone and the headset are close enough to enable communications to occur.

If the determination in step 609 that the phone is within range of the headset, the implication is that the phone is still in the possession of a rightful user of the phone who is attempting to access features of the phone. Hence, a simple password is requested in step 425 through the unlocking screen. Once input is entered using the unlocking screen, a determination is made in step 629 regarding whether the simple password is correctly provided.

If it is determined that the simple password is correctly provided, then the unlocking screen is unlocked in step 621. In the described embodiment, after a simple password is correctly entered through the unlocking screen, the phone is effectively unlocked and substantially all features of the phone may be accessed in step 621. The method of unlocking the device is completed upon the phone being effectively unlocked.

Alternatively, if it is determined in step 629 that the simple password is not correctly provided, process flow moves to an optional step 633 in which additional information is requested, and the unlocking screen may be unlocked if the additional information is authenticated. The additional information is generally information that a rightful owner or user of the phone has knowledge of, but that a wrongdoer is unlikely to have knowledge of. After additional information is optionally requested, the method of unlocking the device is completed. It should be understood that in one embodiment, when a simple password is not correctly provided, no additional information may be requested, and the unlocking screen may remain locked.

Returning to step 609, if the determination is that the phone is not within range of the headset, a complex password is requested in step 613 to unlock the unlocking screen. In step 617, a determination is made as to whether the complex password is correctly provided. If the determination in step 617 is that the complex password is correctly provided, the unlocking screen and, hence, the phone is unlocked in step 621. In the described embodiment, unlocking the phone provides access to substantially all features of the phone.

Alternatively, if the determination in step 617 is that the complex password is not correctly provided, process flow proceeds to step 637 in which a simple password is requested to unlock the unlocking screen. It should be appreciated that the simple password requested in step 637 is generally the same simple password that is requested in step 625. Once input, e.g., a string of digits or characters, is detected as being entered using the unlocking screen, it is determined in step 641 whether a simple password is correctly provided.

If it is determined in step 641 that a simple password has not been correctly provided, the unlocking screen effectively remains locked in step 645, and access to substantially all features of the phone is essentially denied. The method of unlocking a device is completed upon maintaining the unlocking screen. Alternatively, if it is determined in step 641 that the simple password is correctly provided, the unlocking screen is unlocked in step 649, and access is provided to a subset of substantially all features of the phone. That is, the phone is effectively partially unlocked in step 649 and is allowed to operate with relatively limited functionality. It should be appreciated that the subset of features that may be used upon correctly providing the simple password may be predetermined by an owner of the phone. In one embodiment, if the phone is subsequently moved into range of the headset, the phone may substantially automatically transition from enabling access to a subset of features to enabling access to substantially all features. After access is provided to a subset of features, the method of unlocking a device is completed.

Figure 7:
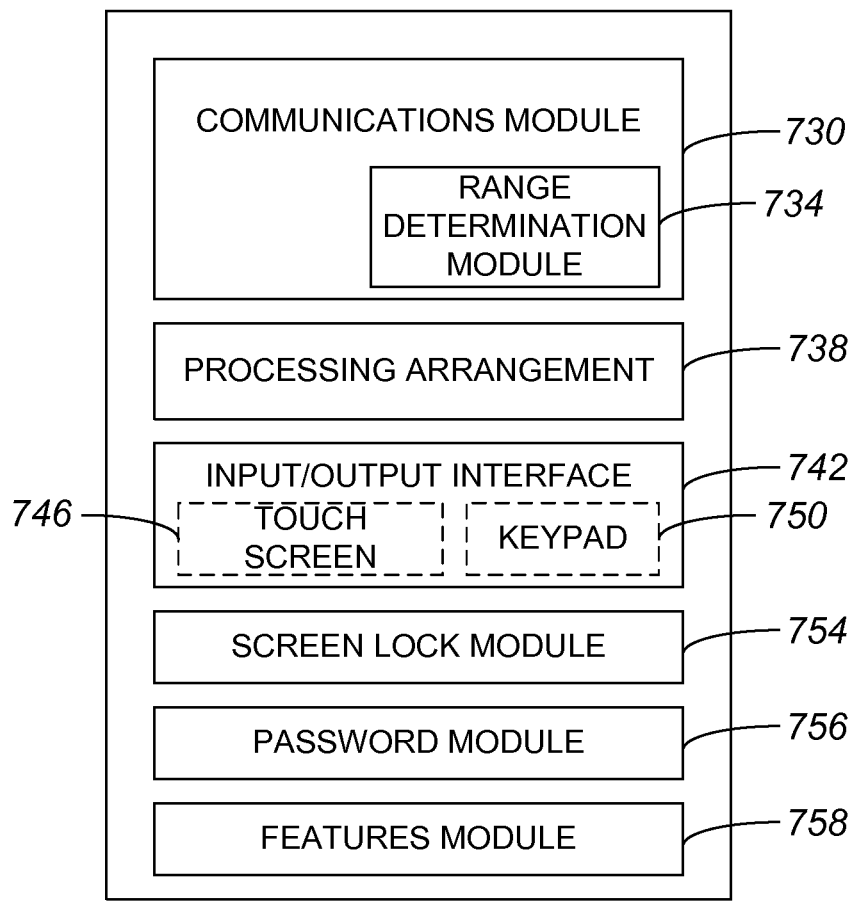
FIG. 7 is a block diagram representation of a device that supports passwords of different complexities based upon a relative location of the device in accordance with an embodiment.

With reference to FIG. 7, one embodiment of a device that supports passwords of different complexities for use in unlocking the device based upon a relative location of the device will be described. A device 712 may be any suitable device that is arranged to be paired to another device (not shown), e.g., a token, for communications purposes. In one embodiment, device 712 may be a Bluetooth-enabled device such as a smart phone.

Device 712 includes a communications module 730 that is arranged to enable device 712 to be paired with another device (not shown) and to communicate with the other device. If device 712 is a Bluetooth-enabled device, the communications module 730 may be arranged to support Bluetooth communications. Communications module 730 includes a range determination module 734 that is configured to determine a distance, e.g., a physical separation, between device 712 and another device (not shown) to which device 712 is paired. In general, range determination module 734 may be configured to determine whether device 712 is within a communications range of another device (not shown) to which device 712 is paired.

A processing arrangement 738 is typically arranged to execute logic associated with device 712. For example, processing arrangement 738 may execute logic included in communications module 730 to enable device 712 to communicate through communications module 730.

A password module 756 is configured to allow a user of device 712 to set at least one password that may be used to unlock device 712 when device 712 is locked. Password module 756 may generally allow a user to set a simple password that may be used to unlock device 712 when device 712 is within a first range, and to set a complex password that may be used to unlock device 712 when device 712 is not within the first range.

A screen lock module 754 is arranged to generate an unlocking screen for use in unlocking device 712 in the event that device 712 is locked. Screen lock module 754 generates an unlocking screen, for example, when device 712 is woken from a sleep stat, as well as when device 712 is powered on after being powered off.

An input/output interface 742 is configured to obtain input from a user of device 712. For example, input/output interface 742 may enable a user to enter a password when an unlocking screen is displayed. Input/output interface 742 may include, but is not limited to including, a touchscreen 746 and/or a keypad 750. Touchscreen 746 and/or keypad 750 generally allow a user to set passwords, to access features, and to utilize features of device 712.

A features module 758 provides functionality associated with features of device 712. Features module 758 may include applications, e.g., applications that include logic that processing arrangement 738 may execute, and data that is stored on device 712 or is accessible to device 712.

In one embodiment, as mentioned above, when a device is in a known environment, a simple password may be used to unlock the device. In such an embodiment, when the device is determined not to be in the known environment, a complex password may be used to unlock the device. A known environment may be any suitable environment. For example, a network may be an environment, and if a device such as a computer is known within the network, a simple password may be used to unlock an unlocking screen of the computer when the computer is detected within the network, while a complex password may be used to unlock the unlocking screen of the computer when the computer is determined to be outside of the network. A range associated with a cell phone tower may also be an environment such that a simple password may unlock a cell phone if an attempt to use the cell phone is made within the range, while a complex password may unlock the cell phone if an attempt to use the cell phone is determined as not occurring from within the range. A known environment may also be a physical location such that a simple password may unlock a device at the physical location and a complex password may unlock the device away from the physical location.

Figure 8:
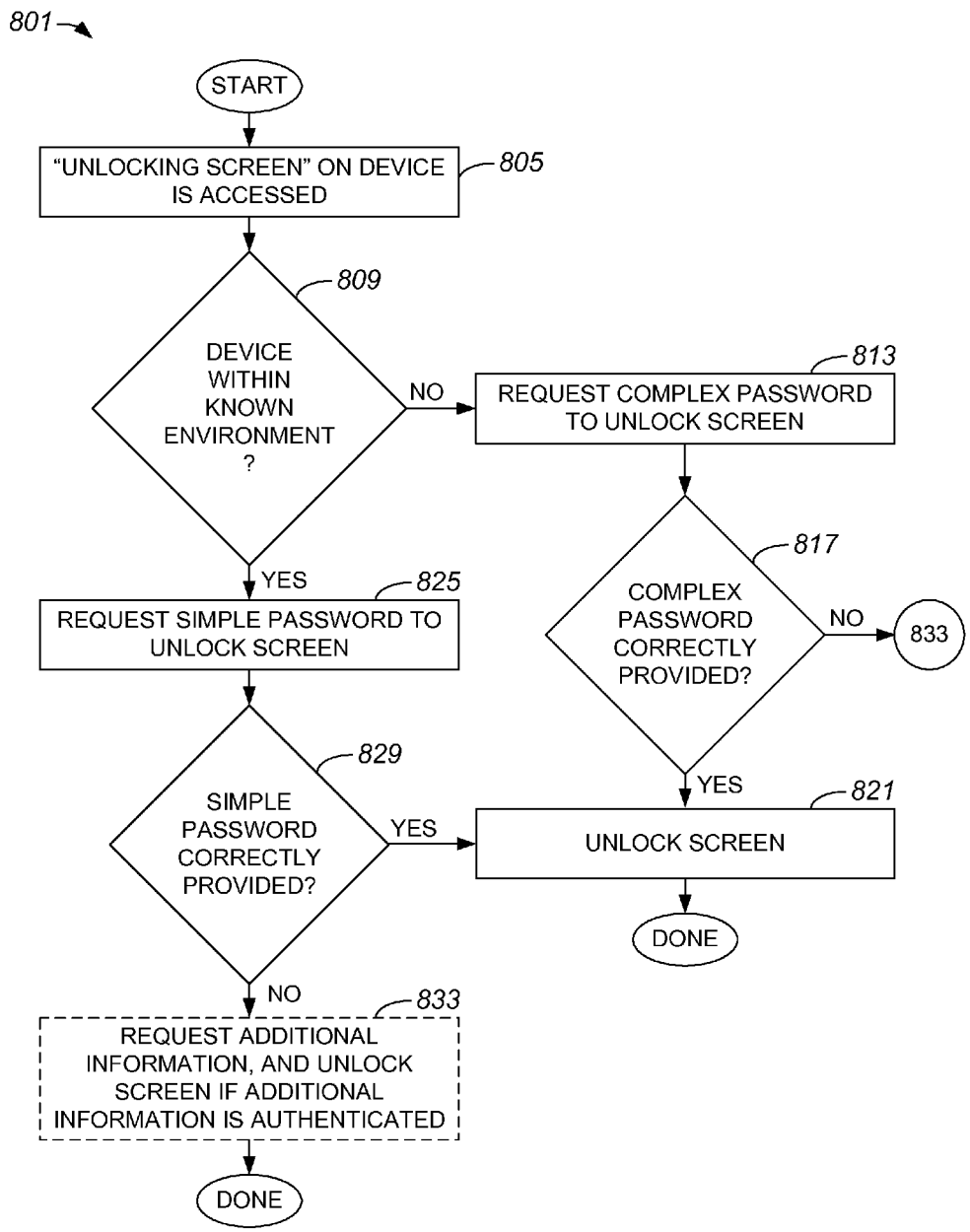
FIG. 8 is a process flow diagram which illustrates a method of utilizing passwords of different complexities to unlock a device based upon whether the device is in a known environment in accordance with an embodiment.

FIG. 8 is a process flow diagram which illustrates a method of utilizing passwords of different complexities to unlock a device based upon the presence of the device with respect to a known environment in accordance with an embodiment. A method 801 of unlocking a device begins at step 805 in which an unlocking screen on the device, as for example a computer or a phone, is accessed. After the unlocking screen on a device is accessed, a determination is made in step 809 as to whether the device is within a known environment. A known environment may generally be any environment within which the device is recognized and/or any environment that the device recognizes. For example, the environment may be a range of a WiFi signal that the device is essentially programmed to utilize.

If it is determined in step 809 that the device is within a known environment, the implication is that a rightful user of the device, e.g., an owner of the device, and that the rightful user is attempting to unlock the device. Accordingly, a simple password is requested in step 825 through the unlocking screen. As discussed above, a simple password may be a relatively short password. Upon obtaining input through the unlocking screen, a determination is made in step 829 regarding whether the simple password is correctly provided.

If the determination in step 829 is that the simple password is correctly provided, then the unlocking screen is unlocked in step 821. In other words, the device is effectively unlocked and features of the device may be accessed in step 821 after it is determined that a simple password is correctly entered through the unlocking screen. After the unlocking screen is unlocked, the method of unlocking a device is completed.

Alternatively, if the determination in step 829 is that the simple password is not correctly provided, process flow moves to an optional step 833 in which additional information is requested, and the unlocking screen may be unlocked if the additional information is authenticated. The additional information may include, but is not limited to including, answers to security questions that have been preset and/or identifying information associated with an owner or user of the phone. After additional information is optionally requested, the method of unlocking a device is completed. It should be understood that in one embodiment, in lieu of requesting additional information when a simple password is not correctly provided, the unlocking screen may remain locked.

Returning to step 809, if the determination is that the device is not within a known environment, a more complex password is requested in step 813 to unlock the unlocking screen and, hence, the device. In step 817, it is determined whether the complex password is correctly provided. If it is determined that the complex password is not correctly provided, process flow proceeds to optional step 833 in which additional information is requested, and the unlocking screen is unlocked if the additional information is authenticated. Alternatively, if the determination in step 817 is that the complex password is correctly provided, then the unlocking screen and, hence, the device is unlocked in step 821.

Figure 9:
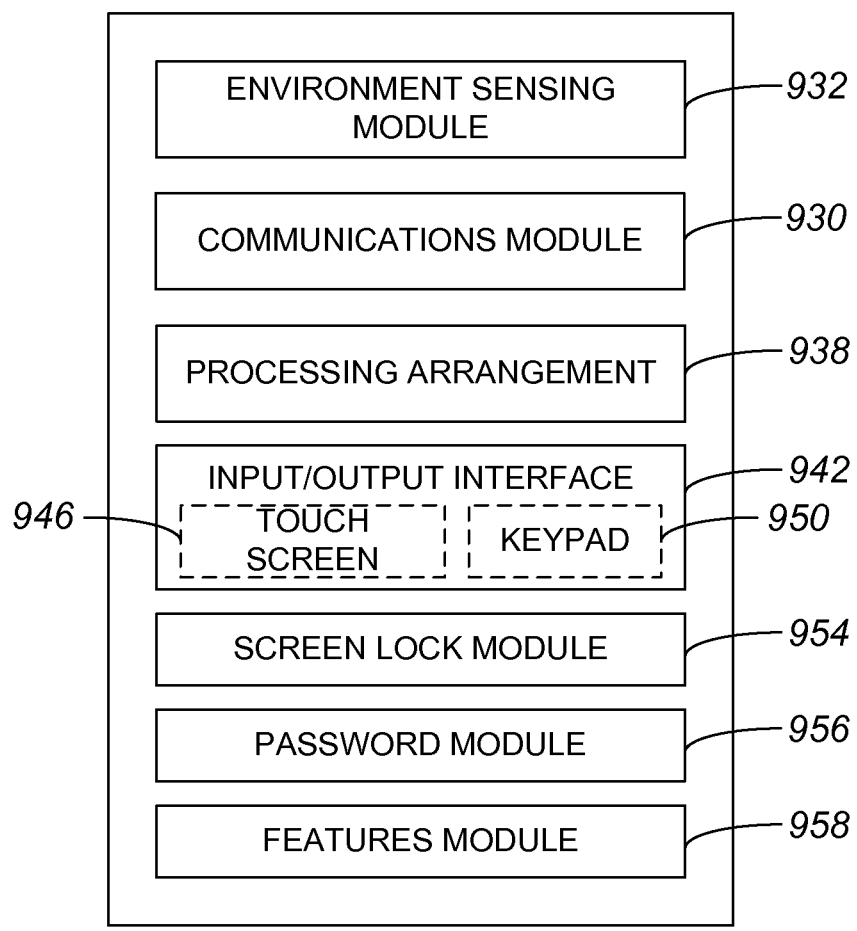
FIG. 9 is a block diagram representation of a device that supports passwords of different complexities based upon an environment in which the device is located in accordance with an embodiment.

FIG. 9 is one embodiment of a device that supports passwords of different complexities for use in unlocking the device based upon a surrounding environment. A device 912, which may be any suitable device including a phone and a computer, includes an environment sensing module 932 that is arranged to enable device 912 to effectively identify a surrounding environment. In one embodiment, environment sensing module 932 is configured to detect whether device 912 is in an expected environment, e.g., an environment that is known or recognizable to device 912. For example, environment sensing module 932 may detect when device 912 is within a WiFi network to which device 912 is registered.

A communications module 930 is configured to enable device 912 to communicate with other devices (not shown). Communications module 930 may also be configured to cooperate with environment sensing module 932 such that environment sensing module 932 may identify whether device 912 is in a known environment. By way of example, communications module 930 may determine that there is a wireless network that may be suitable for use by device 912, and environment sensing module 932 may determine whether the wireless network is a known environment.

A processing arrangement 938 is generally arranged to execute logic associated with device 912. For example, processing arrangement 938 may execute logic included in communications module 930 to enable device 912 to communicate.

A password module 956 is configured to allow a user of device 912 to set at least one password that may be used to unlock device 912 when device 912 is locked. Password module 956 may generally allow a user to set a simple password that may be used to unlock device 912 when device 912 is within a known environment, and to set a complex password that may be used to unlock device 912 when device 912 is not within a known environment.

A screen lock module 954 is arranged to generate an unlocking screen for use in unlocking device 912 in the event that device 912 is locked. Screen lock module 954 generates an unlocking screen, for example, when device 912 is woken from a sleep stat, as well as when device 912 is powered on after being powered off.

An input/output interface 942 is configured to obtain input from a user of device 912. For example, input/output interface 942 may enable a user to enter a password when an unlocking screen is displayed. Input/output interface 942 may include, but is not limited to including, a touchscreen 946 and/or a keypad 950. Touchscreen 946 and/or keypad 950 generally allow a user to set passwords, to access features, and to utilize features of device 912.

A features module 958 provides functionality associated with features of device 912. Features module 958 may include applications, e.g., applications that include logic that processing arrangement 938 may execute, and data that is stored on device 912 or is accessible to device 912.

Although only a few embodiments have been described in this disclosure, it should be understood that the disclosure may be embodied in many other specific forms without departing from the spirit or the scope of the present disclosure. By way of example, while a determination of which password of a plurality of passwords to used based on a relative location of a device such as a phone has been described as essentially being a choice between using a short or simple password and using a long or complex password, such a choice is not limited to being between using a short password and using a long password. A simple password may be one which uses a relatively small set of characters, while a complex password may be one which uses a larger set of characters. In addition, different passwords may generally be selected for use based upon the relative location of a device, and the different passwords may be of equal weight, length, and/or complexity in some embodiments. In other words, different passwords used based upon where a device is located relative to a token or an environment are not limited to having different complexities.

As discussed above, when a device is determined not to be in a known or expected environment, a complex password may be used to unlock the device. Known environments may vary widely and may include, but are not limited to including, networks, ranges, and locations. Known environments may also be associated with individuals. For instance, for a device that includes a motion sensor, if a detected motion is consistent with the gait of the owner of the device, then a simple password may be used to unlock the device. On the other hand, if a detected motion is not consistent with the gait of the owner, then a complex password may be used to unlock the device. In one embodiment, if a device is temperature sensitive and is generally used in an environment that has a particular temperature range, a simple password may be used to unlock the device if the temperature is detected as being in the particular temperature range, while a complex password may be used to unlock the device if the temperature is detected as being outside of the particular temperature range.

A device may be paired with more than one token such that when the device is within range of any of the tokens with which it is paired, a simple password may be used to unlock the device. When a device that is paired with more than one token is not within range of any of the tokens, a complex password may be used to unlock the device. Similarly, a device may be associated with more than one environment. When a device is associated with more than one environment, if the device is determined to be within any of the associated environments, a simple password may be used to unlock the device. If a device is determined not to be in any of its associated environments, a complex password may be used to unlock the device. For example, if a device is associated with an office network and a home network, if the device is determined to be either at the office or at the home, a simple password may be used to unlock the device, whereas if the device is determined not to be at the office or at the home, a complex password may be used to unlock the device.

The embodiments may be implemented as hardware and/or software logic embodied in a tangible medium that, when executed, is operable to perform the various methods and processes described above. That is, the logic may be embodied as physical arrangements or components. A tangible medium may be substantially any computer-readable medium that is capable of storing logic which may be executed, e.g., by a computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and/or transitory propagating signals.

The steps associated with the methods of the present disclosure may vary widely. Steps may be added, removed, altered, combined, and reordered without departing from the spirit of the scope of the present disclosure. By way of example, although determining whether a device is within range of a token or whether a device is within a particular environment is generally described as occurring after an unlocking screen of the device is accessed, it should be appreciated that determining whether a device is within range of a token or whether a device is within a particular environment may instead occur prior to an unlocking screen of the device being accessed. Further, a device may remain in an "out of range state" such that a complex password is needed to unlock the device if there was any unsuccessful attempt to unlock the device and the device was out of range at some point after the device was most recently successfully unlocked. Therefore, the present examples are to be considered as illustrative and not restrictive, and the examples is not to be limited to the details given herein, but may be modified within the scope of the appended claims.

What is claimed is:

1. A method comprising:
   determining a location of a device relative to a reference;
   identifying a first password from a plurality of passwords for use to unlock the device based on the location of the device relative to the reference, the plurality of passwords including at least one complex password and at least a first simple password;
   prompting for input arranged to unlock the device;
   obtaining the input;
   determining when the input matches the first password;
   completely unlocking the device when it is determined that the input matches the first password;
   when it is determined that the input does not match the first password, determining when the input matches a second password; and
   when it is determined that the input matches the second password, unlocking the device to provide access to a subset of features of the device.

2. The method of claim 1 wherein determining the location of the device relative to the reference includes determining when the location of the device relative to the reference is within a first range, and wherein the first password is the at least first simple password when it is determined that the location of the device relative to the reference is within the first range and the first password is the at least one complex password when it is determined that the location of the device relative to the reference is not within the first range.

3. The method of claim 2 wherein when it is determined that the location of the device relative to the reference is within the first range and when it is determined that the input matches the first password, completely unlocking the device includes providing access to all features of the device.

4. The method of claim 3 wherein when it is determined that the location of the device relative to the reference is not within the first range and when it is determined that the input matches the first password, completely unlocking the device includes providing access to all features of the device.

5. The method of claim 3 wherein when it is determined that the location of the device relative to the reference is not within the first range and when it is determined that the input does not match the first password, determining when the input matches the second password includes determining when the input matches the at least a second simple password.

6. The method of claim 1 wherein the reference and the device are paired.

7. The method of claim 6 wherein the reference is a Bluetooth-enabled token and the device is a Bluetooth-enabled device.

8. The method of claim 7 wherein the Bluetooth-enabled token is a Bluetooth-enabled headset and the Bluetooth-enabled device is a Bluetooth-enabled phone.

9. The method of claim 1 wherein prompting for the input to unlock the device includes providing an interface to request the input.

10. The method of claim 1 wherein the at least first simple password includes a first number of characters and the at least one complex password includes a second number of characters, the first number of characters being less than the second number of characters.

11. The method of claim 1 wherein the reference is an environment.

12. A tangible, non-transitory computer-readable medium comprising computer program code, the computer program code, when executed, configured to:
determine a location of a device relative to a reference;
identify a first password from a plurality of passwords for use to unlock the device based on the location of the device relative to the reference, the plurality of passwords including at least one complex password and at least a first simple password;
prompt for input arranged to unlock the device;
obtain the input;
determine when the input matches the first password; and
completely unlock the device when it is determined that the input matches the first password;
when it is determined that the input does not match the first password, determine when the input matches a second password; and
when it is determined that the input matches the second password, unlock the device to provide access to a subset of features of the device.

13. The tangible, non-transitory computer-readable medium comprising computer program code of claim 12 wherein the computer code configured to determine the location of the device relative to the reference is further configured to determine when the location of the device relative to the reference is within a first range, and wherein the first password is the at least first simple password when it is determined that the location of the device relative to the reference is within the first range and the first password is the at least one complex password when it is determined that the location of the device relative to the reference is not within the first range.

14. The tangible, non-transitory computer-readable medium comprising computer program code of claim 13 wherein when it is determined that the location of the device relative to the reference is within the first range and when it is determined that the input matches the first password, the computer code configured to completely unlock the device is further configured to provide access to all features of the device.

15. The tangible, non-transitory computer-readable medium comprising computer program code of claim 14 wherein when it is determined that the location of the device relative to the reference is not within the first range and when it is determined that the input matches the first password, the computer code configured to completely unlock the device is further configured to provide access to all features of the device.

16. The tangible, non-transitory computer-readable medium comprising computer program code of claim 14 wherein when it is determined that the location of the device relative to the reference is not within the first range and when it is determined that the input does not match the first password, the computer program code is further configured to determine when the input matches the at least a second simple password.

17. The tangible, non-transitory computer-readable medium comprising computer program code of claim 12 wherein the reference and the device are paired.

18. An apparatus comprising:
a processor;
a sensing arrangement, the sensing arrangement being arranged to determine a location relative to a reference;
a first arrangement, the first arrangement embodied on a tangible, non-transitory computer-readable medium, the first arrangement being arranged to cooperate with the processor to identify a selected password from a plurality of passwords to use to enable access to at least one feature associated with the apparatus based on the location relative to the reference, the plurality of passwords including at least a complex password and a simple password;
an input interface, the input interface being arranged to obtain an input; and
a second arrangement, the second arrangement being arranged to cooperate with the processor to determine when the input matches the selected password, the second arrangement further being arranged to provide access to the at least one feature when it is determined that the input matches the selected password, wherein the second arrangement is still further configured to provide access to all features when the input matches the complex password and to provide access to less than all features when the input matches the simple password.

19. The apparatus of claim 18 wherein the location is associated with a third arrangement, the third arrangement being paired to the apparatus.

20. The apparatus of claim 19 wherein the third arrangement is a Bluetooth-enabled headset and the apparatus is a Bluetooth-enabled phone.

21. The apparatus of claim 18 wherein the first arrangement is arranged to identify the simple password as the selected password when the location relative to the reference is within a first range of the reference, and wherein the first arrangement is arranged to identify the complex password as the selected password when the location relative to the reference is not within the first range.

22. The apparatus of claim 21 wherein the second arrangement is further arranged to provide access to a set of features associated with the apparatus when the simple password is identified as the selected password and the second arrangement determines that the input matches the selected password.

23. The apparatus of claim 22 wherein the second arrangement is further arranged to provide access to a subset of the set of features when the complex password is identified as the selected password and the second arrangement determines that the input does not match the selected password but matches the simple password.

24. The apparatus of claim 18 wherein the reference is an environment.

25. A method comprising:
determining a location of a device relative to a reference;
identifying a complex password from a plurality of passwords for use to unlock the device based on the location of the device relative to the reference, the plurality of passwords including the complex password and a simple password, wherein the complex password and the simple password are each configured to unlock the device;

prompting for input arranged to unlock the device;

obtaining the input;

determining when the input matches the complex password;

completely unlocking the device when it is determined that the input matches the complex password, wherein completely unlocking the device provides access to a full set of features associated with the device;

determining when the input matches the simple password when it is determined that the input does not match the complex password; and partially unlocking the device when it is determined that the input matches the simple password, wherein partially unlocking the device provides access to a partial set of the features associated with the device.

* * * * *